C. PETERSEN.
AUTOMOBILE LOCK.
APPLICATION FILED MAY 29, 1918.
1,277,113.
Patented Aug. 27, 1918.
2 SHEETS—SHEET 1.
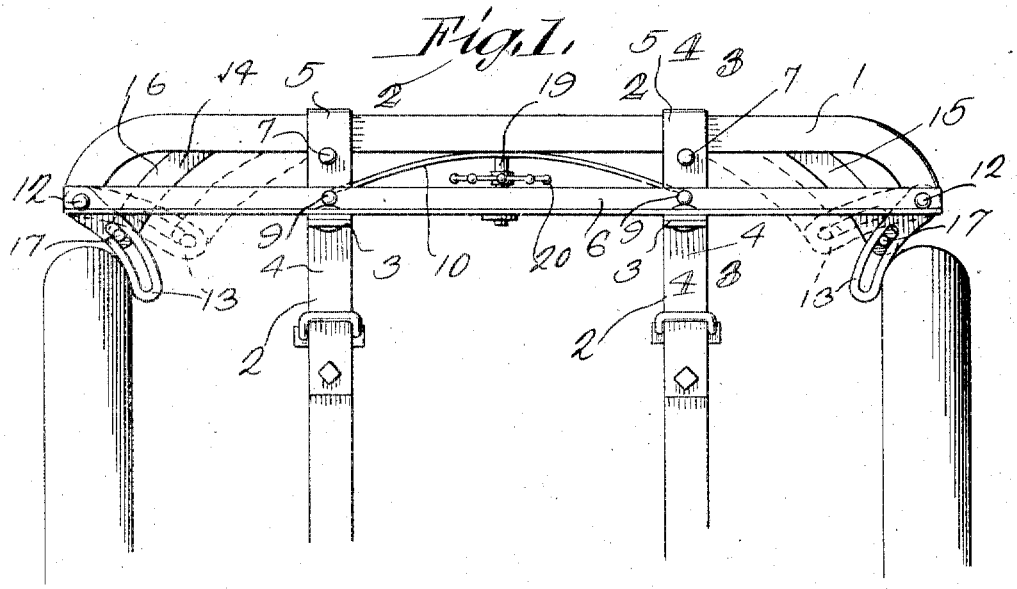
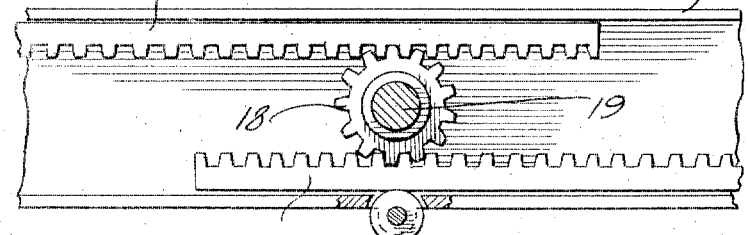
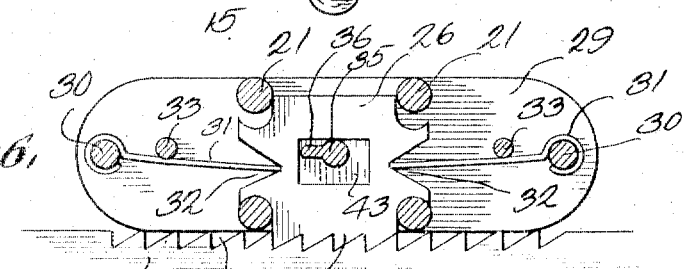
WITNESSES
R. W. Hoagland
Wm. H. Mulligan
INVENTOR
Carl Petersen,
BY Richard Bowen.
ATTORNEY C. PETERSEN.
AUTOMOBILE LOCK.
APPLICATION FILED MAY 29, 1918.
1,277,113.
Patented Aug. 27, 1918.
2 SHEETS—SHEET 2.
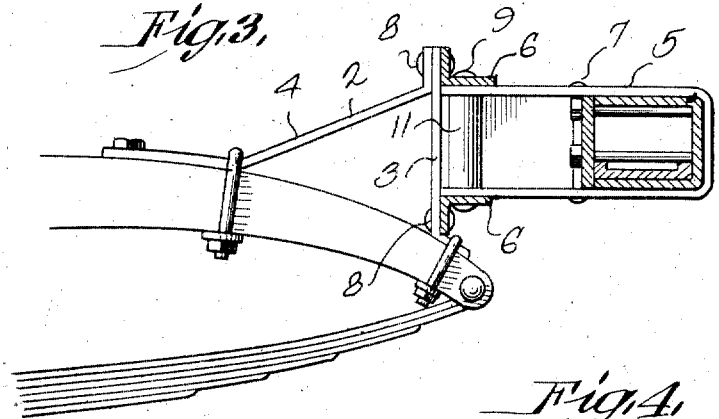
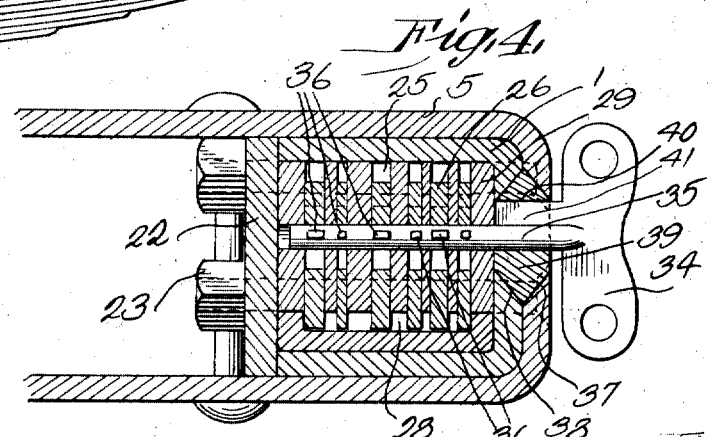
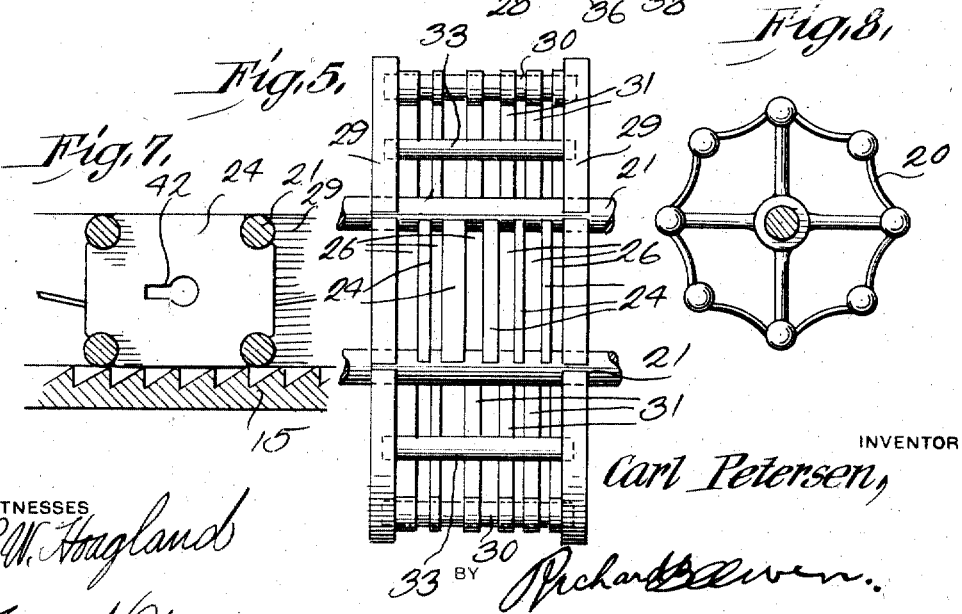
WITNESSES
INVENTOR
Carl Petersen,
BY
ATTORNEY

UNITED STATES PATENT OFFICE.

CARL PETERSEN, OF SAN FRANCISCO, CALIFORNIA.

AUTOMOBILE-LOCK.

1,277,113.

Specification of Letters Patent.   Patented Aug. 27, 1918.

Application filed May 29, 1918. Serial No. 237,263.

*To all whom it may concern:*

Be it known that I, CARL PETERSEN, a subject of the King of Denmark, residing at San Francisco, in the county of San Francisco and State of California, have invented certain new and useful Improvements in Automobile-Locks, of which the following is a specification.

This invention relates to automobile locks and the primary object is to provide an attachment whereby the theft of the automobile either under its own power or by towing, will be prevented.

One of the objects of the invention is to provide an attachment for the front of the automobile which will include wheel engaging members associated with a special form of lock adapted to hold the wheel engaging members in a fixed position so that turning or guiding of the wheels will be prevented.

The invention also aims at the provision of an improved attachment for an automobile which may be readily placed into operative position by a simple turn of a conveniently located hand wheel but which will require the use of a special key to unlock the structure when the owner or operator is about to use the automobile.

A further object of the invention is to provide a device of this character which consists of comparatively few parts and is simple in construction, but durable and well adapted to withstand the rough usage to which devices of this character are ordinarily subjected.

For a full description of the invention and the advantages and merits thereof, reference is to be had to the following description and accompanying drawings, in which:—

Figure 1 is a plan view of the front end of an automobile showing the invention applied thereto.

Fig. 2 is an enlarged fragmentary section taken on the line 2—2 of Fig. 1.

Fig. 3 is an enlarged transverse section.

Fig. 4 is a section taken on the line 4—4 of Fig. 1.

Fig. 5 is an enlarged plan view of the locking mechanism.

Fig. 6 is a longitudinal section through the same.

Fig. 7 is a fragmentary longitudinal section taken on a different plane from that shown in Fig. 6.

Fig. 8 is an elevation of the hand wheel used with the attachment.

Referring to the drawing, the bumper 1 is mounted at the front end of the automobile in the usual manner and consists of a length of channel iron having its ends curved rearwardly and terminating directly in front of the front wheels of the automobile as shown in Fig. 1. The bumper is preferably attached to the front ends of the side bars of the automobile frame and to accomplish this, each side bar is provided with a bracket 2 which consists of the upright standards 3 fastened to the front end of the side bar of the frame and the brace bar 4 fixed in any preferred manner to the side bar of the frame. A yoke 5 is employed in connection with each bracket and the yokes embrace the channel iron 1 and are connected to the portion 3 of the bracket by the angle irons 6, which have their ends joined to the terminals of the channel iron of the bumper 1. Bolts or rivets 7 are passed through the yoke 5 and engage the edges of the angle iron 1 to hold the yoke rigidly to the channel iron and the angle irons 6 are rigidly fixed to the bracket by rivets 8. The connection between the yoke 5 and the angle irons 6 is established by the vertical bolts 9. These bolts 9 receive the ends of the arcuate brace member 10 the ends of the same being provided with suitable loops 11 to receive the bolts 9.

End bolt 12 connects the ends of the angle irons 6 with the ends of the bumper or channel iron 1 and pivotally mounted on these bolts 12 are the locking arms 13 which are adapted to swing into engagement with the automobile wheel tire as shown in full lines in Fig. 1 so that turning of the wheels in either direction will be prevented when the locking levers are in this position. Between the flanges of the channel iron 1 are mounted the rack bars 14 and 15, the upper rack bar 14 having its outer end curved as at 16 and joined to the arms 13 while the lowermost rack 15 has its outer end similarly curved and joined to the opposite arm 13. To thus join the rack bars 14 and 15 with the locking arm 13 the latter are provided with arcuate slots in which are received the pins 17 carried by the ends of the rack bars. To actuate the rack bars for swinging the locking arms out of engagement with the automobile tires, a gear 18 is provided the teeth of which engage the teeth in both rack bars at diametrically opposite points so that the rack bars will move in opposite directions when the gear is turned. The gear 18 is mounted on a shaft 19 having one end journaled in the vertical wall of the channel iron and its rear end journaled in a bracket carried by the angle iron 6. The center of the arcuate brace member 10 is provided with an opening through which the shaft 19 is extended and the shaft carries a hand wheel 20 which may be rotated for imparting the necessary movement to the shaft for turning the gear 18 whereby the rack bars 14 and 15 may be properly actuated.

In Figs. 4, 5, 6 and 7 of the drawing, is shown a special form of lock designed for use with this attachment. This lock is mounted between the flanges of the channel iron 1 at a point embraced by one of the yokes 5. Four fastening bolts 21 are provided, the heads of which are countersunk in the front end of the yoke 5. The opposite ends of the bolts are projected through suitable openings in a retaining plate 22 which engages the edges of the channel iron 1 as shown to advantage in Fig. 4. The nuts 23 are mounted upon the ends of the bolts 21 and engage the plate 22 to hold it in applied position. The bolts 21 carry rigidly fixed baffle plates 24 which are of different thicknesses so that spaces 25 of different widths are provided between the plates 24. A plurality of latch plates 26 are mounted in the spaces 25, and have teeth 27 adapted to engage teeth 28 formed in a portion of the lowermost rack bar 15. Filler plates 29 are arranged between the uppermost flange of the channel iron and the lower rack bar 15 and at opposite ends of the assembled plates 24 and 26. The bolts 21 are extended through the plates 29 and these bolts also serve to act as guides for the latch plates 26 which as shown to advantage in Fig. 6 of the drawing, are vertically movable so that the teeth 27 may engage and disengage the teeth 28 of the rack bar 15. Rods 30 carried by the ends of the plates 29 are provided with flat springs 31 the free ends of which are engaged with recesses 32 formed in opposite edges of the latch plate 26. These flat springs are engaged by the cross pins 33 also carried by the plate 29 and tend to urge the springs into position for exerting a pressure on the latch plate 26 whereby the teeth normally engage the teeth in the rack bar 15. The latch plates 26 are of different thicknesses and consequently the springs 31 as shown to advantage in Fig. 5 of the drawing, are also of different thicknesses. The key 34 employed for operating the latch plate consists of the shank 35 having a plurality of disks 36 projecting therefrom, each of which is equal in width to the thickness of the corresponding latch plate 26. The meeting faces of the front ends of the yoke 5 and the vertical wall of the channel iron 1 are oppositely recessed as indicated at 37 and 38. Thus a recess is provided to receive the rotatable disk 39 which has a key opening and a slot 40.

The key has a leaf 41 adapted to be received in the slot 40 so that the disk 39 is rotated when the key is turned. This slot 40 also permits the passage of the disk 36 when the key is inserted in the lock. Each plate 24 has the center key opening 42 and each latch plate 26 has a rectangular opening 43. The disk 36 engages one edge of the opening when the key is turned so that the plates 26 are raised out of engagement with the teeth of the rack bar 15 and against the pressure exerted by the flat springs 31. The teeth 27 and 28 however, are constructed so that the rack bar 15 may move in one direction but cannot move in the opposite direction until the key is employed to actuate the latch plate.

In use, when the operator desires to leave the automobile standing in a public place, the locking levers 13 will be swung into engagement with the tires of the front wheel as shown in full lines in Fig. 1 of the drawing. The wheels will be thereby locked against movement in either direction and since the automobile cannot be guided, theft of the same will be prevented either by towing or attempting to move the automobile under its own power. By inserting the key, however, the operator may release the latch plate 26 from engagement with the rack bar 15 and turn the hand wheel 20 causing the rack bars to move which will swing the locking arms 13 out of engagement with the tires as shown by dotted lines in Fig. 1 thus permitting the wheels to turn in the usual manner. The channel iron 1 which is utilized to mount the lock and the associated mechanism acts as a bumper such as is commonly mounted on the front of vehicles of this character. Therefore the attachment will not detract from the general appearance of the front of the vehicle. In types of automobiles having a different front structure, it will be merely necessary to alter the shape of the bracket 2 so that the device may be conveniently attached.

The foregoing description and accompanying drawings have reference to what may be considered to be the preferred form of my invention. I desire it to be understood that I may make such changes in construction, combination and arrangement of parts, materials, and dimensions, et cetera, as may prove expedient and fall within the scope of the appended claims.

Having thus fully described my invention what I claim as new and desire to secure by Letters Patent, is:—

1. In combination with an automobile bumper, wheel engaging means mounted on the bumper and movable into and out of engagement with the wheels of the automobile, rack bars slidably mounted on the bumper and each having one end connected to one of the wheel engaging means, and means for actuating the rack bars in opposite directions.

2. In combination with an automobile bumper, locking arms pivotally mounted on the end of the bumper, rack bars slidably mounted on the bumper and each rack bar being connected to one of the said locking arms, a gear engageable with the rack bars to simultaneously move them in opposite directions, and means for rotating the gear.

3. In combination with an automobile bumper, wheel engaging means mounted on the bumper and adapted for movement into and out of engagement with the wheels, rack bars slidably mounted on the bumper and engageable with the wheel engaging means to move the latter, and means for locking the rack bars against movement.

4. In combination with an automobile bumper, wheel engaging means mounted on the bumper, longitudinally movable members carried by the bumper and connected to the said wheel engaging means for simultaneously actuating the wheel engaging means, means for locking the said members against movement in one direction and means to permit movement of the said members in the opposite direction.

5. In combination with an automobile bumper, wheel engaging arms pivotally mounted on the bumper, rack bars connected to the arms and adapted for movement on the bumper to move the arms into and out of engagement with the automobile wheels, and means mounted on the bumper to lock the said bars against movement in one direction.

6. In an automobile attachment, the combination with a bumper, wheel engaging means carried by the bumper, means mounted on the bumper to actuate the wheel engaging means, locking latches releasably engaged with the second mentioned means, and constructed to permit the latter to move in a direction for engaging the wheel engaging means with the tire, and for preventing movement of the said means in the opposite direction.

In testimony whereof I affix my signature in presence of two witnesses.

CARL PETERSEN.

Witnesses:
 EMIL PAULSON,
 THOMAS HORNBECK.